United States Patent

[11] 3,590,612

| [72] | Inventor | David H. Henning |
| | | Saginaw, Mich. |
| [21] | Appl. No. | 879,747 |
| [22] | Filed | Nov. 25, 1969 |
| [45] | Patented | July 6, 1971 |
| [73] | Assignee | General Motors Corporation |
| | | Detroit, Mich. |

[54] VEHICLE CONTROLS AND COINCIDENTAL LOCK THEREFOR
4 Claims, 3 Drawing Figs.

[52] U.S. Cl.................................................. 70/239,
 70/251, 200/44, 200/157
[51] Int. Cl.................................................. B60r 25/02,
 B60r 25/06, E05b 65/12
[50] Field of Search......................................... 70/238,
 239, 251, 252; 200/44, 61.54, 61.88, 157; 180/78

[56] References Cited
UNITED STATES PATENTS
2,796,755  6/1957  Craig........................... 70/239 X
3,490,255  1/1970  Wight et al. ................. 70/252
FOREIGN PATENTS
1,143,963  2/1969  Great Britain................ 70/252
1,143,964  2/1969  Great Britain................ 70/252

Primary Examiner—Albert G. Craig, Jr.
Attorneys—W. E. Finken and D. L. Ellis

ABSTRACT: A concentric transmission selector knob and ignition cylinder lock actuator structure is mounted upon the upper portion of the vehicle steering column mast jacket with the selector knob including rotary electrical switch structure thereon adapted for connection in circuit with a remote apparatus operative to select the various power transmission ranges upon rotation of the knob to its various positions. The rotatable cylinder lock actuator nested within the knob is connected with a rotary ignition switch and further connected by rack and sector drive means to a shiftable lock bolt mounted on the mast jacket for movement between locked and unlocked positions relative to the vehicle steering shaft. A further lock bolt for the selector knob is cammed to a locking position by the actuator to prevent rotation of the knob from such a predetermined range position as "Park," the knob lock bolt being prevented such movement and the actuator, ignition switch and steering shaft lock bolt being prevented movement to locked position except upon selection of the knob to "Park."

PATENTED JUL-6 1971  3,590,612

INVENTOR
David H. Henning
BY
D. L. Ellis
ATTORNEY

VEHICLE CONTROLS AND COINCIDENTAL LOCK THEREFOR

This invention relates to vehicle controls and coincidental lock systems therefor and more particularly to an improved structurally integrated transmission selector, ignition switch actuator and steering mechanism provided with coincidental locking apparatus therefor.

One feature of this invention is that it provides an improved structurally integrated transmission selector control and ignition switch apparatus for automotive vehicles mountable in concentric relation with one another on a convenient support within the vehicle body, each of the transmission selector and ignition controls being independently rotatable to respective operating positions thereof and being further provided with coincidental locking apparatus operative to lock or prevent selection of operative positions thereof coincidentally with locking of the rotatable shaft element of the vehicle steering column apparatus.

Another feature of this invention is the provision of concentrically nested transmission selector knob and key-controlled ignition cylinder lock devices mountable upon an upper support tube portion of the vehicle steering column apparatus for convenient manipulation by the vehicle operator, the knob being associated with rotary electrical switch apparatus or the like control means connectable in circuit with a remote selector device for the vehicle power transmission and the cylinder lock device being connected with a structurally integrated rotary ignition switch, the ignition switch device being further connected with a steering shaft lock bolt and a selector knob lock bolt so that placement of the actuator in a locked condition coincidentally locks the selector knob and the vehicle steering shaft against movement for control of the vehicle.

Yet a further feature of this invention is the compact association of the various described control elements for the vehicle and the lock bolts therefor including a radially shiftable selector knob lock bolt movable to a locked position with respect to the knob by a cam on the rotary actuator operable coincidentally with rotary drive means from the actuator connecting the latter with the steering shaft lock bolt.

A further feature of this invention is in the relationship of the selector knob and gate and stop structure thereon cooperable with the knob lock bolt, the cam on the actuator and the drive means to the steering shaft lock bolt such that placement of both lock bolts in locked position by the key-controlled actuator can only occur upon rotary alignment of the selector knob and its gate and stop structure in a predetermined position corresponding to a nonforward drive range of the vehicle power transmission.

These and other features and advantages of the invention will be readily apparent from the following specification and from the drawings wherein.

Figure 1:
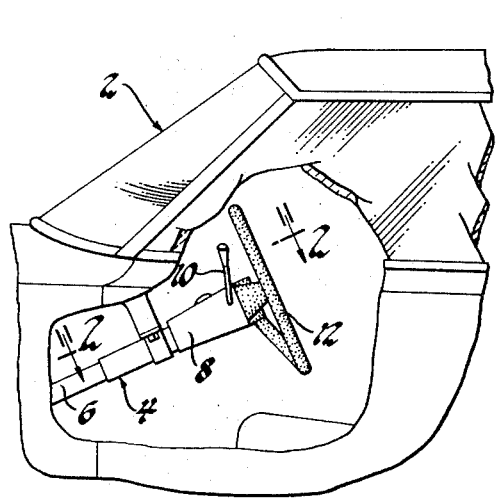
FIG. 1 is a fragmentary partially broken away elevational view of an automotive vehicle including the vehicle control and coincidental locking apparatus of this invention.

Referring now more particularly to FIG. 1 of the drawings, the same shows an automotive vehicle 2 provided within the forward passenger compartment thereof with a generally conventional steering column apparatus 4 including a support tubeor mast jacket 6 mounted stationary within the passenger compartment in well-known manner and carrying at its upper end a stationary control housing 8 of die-cast or like construction. Such housing typically includes therein turn signal apparatus controllable by a selector lever 10. Mounted above housing 8 for rotation relative thereto is the usual steering wheel 12 which, as indicated in FIG. 2, has drive connection with the upper end of a conventional steering shaft assembly extending coaxially through mast jacket 6 and through the vehicle bulkhead or firewall to connection with the vehicle steering gear in the engine compartment.

Figure 2:
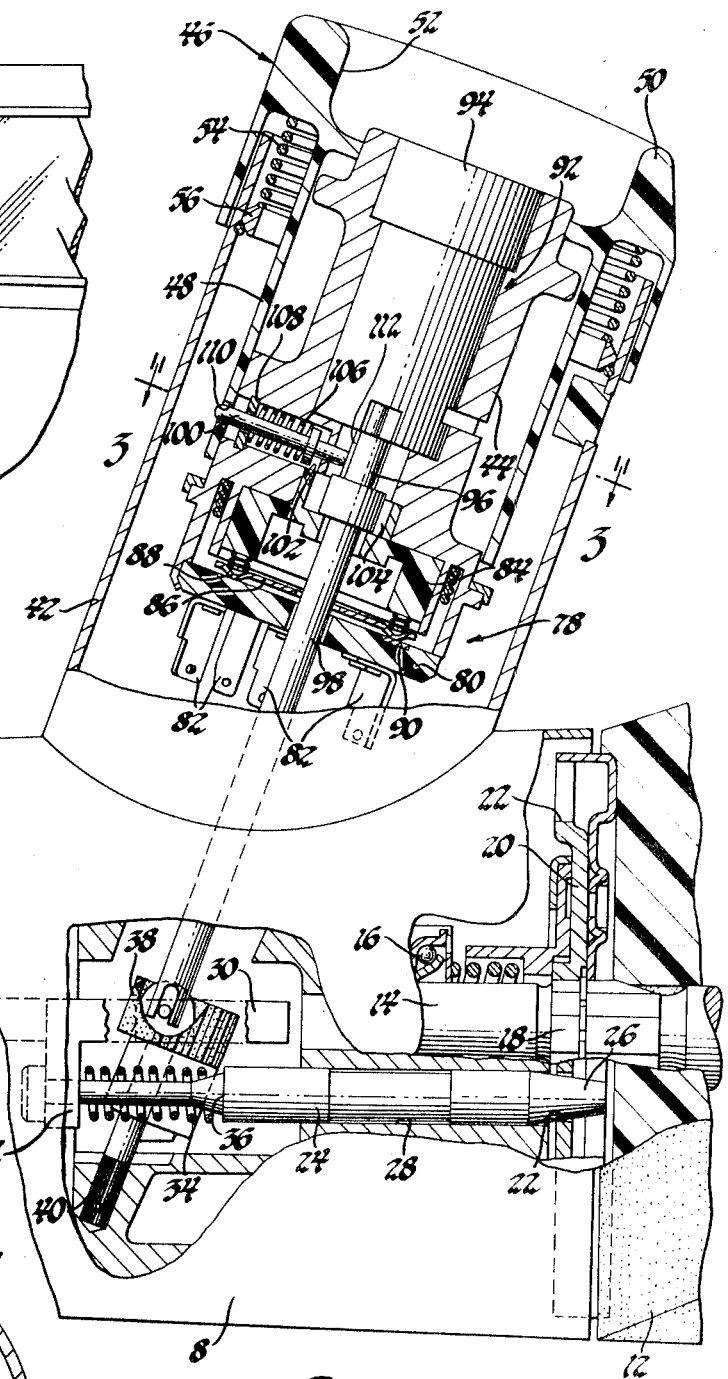
FIG. 2 is an enlarged partially broken away view taken generally along the plane indicated by line 2-2 of FIG. 1.

In the description now initially of such vehicle steering shaft and the portion of the instant coincidental locking structure therefor, it is seen in FIG. 2 that the upper end portion 14 of the steering shaft within housing 8 is supported by a bearing 16 therein and includes splines 18 upon which is engaged the complementarily formed hub of an annular steering shaft keeper plate 20 disposed directly below the hub of steering wheel 12. On its outer periphery, plate 20 is provided with a plurality of keeper notches 22 each adapted to receive the tapered head 26 of a steering shaft lock bolt 24 which is mounted for shiftable movement relative to the keeper plate in a bore 28 of housing 8, such shiftable movement being between a locked position as shown, and a series of withdrawn unlocked positions shifted leftwardly of the position shown. For moving the lock bolt 24 between such positions, an actuator rack indicated at 30 is also slidably mounted in housing 8 and carries an ear 32 embracing a headed end of the lock bolt and held thereagainst by a coil compression spring 34 seated between the ear and a shoulder 36 of the bolt. While not shown in detail, rack 30 includes on its underside a series of rack teeth meshingly engaged with a sector member 38 rotatably mounted within housing 8 by a support shaft 40. Accordingly, rotation of sector 38, as will be described, shifts rack 30 and lock bolt 24 between the locked and unlocked positions of the latter to prevent and selectively permit steering control of the vehicle through manipulation of steering wheel 12. For further details of structure and operation of this type of steering shaft locking apparatus, reference may be had to U.S. application of Wight et al. Ser. No. 691,817, filed Dec. 19, 1967, now U.S. Pat. No. 3,490,255, dated Jan. 20, 1970 and assigned to the assignee of the present invention.

Mast jacket housing 8 is further provided with an integral laterally extending hollow control support 42 adapted for mounting of a concentrically nested transmission dial or knob and key-controlled ignition cylinder lock actuator apparatus. Within the outer tubular portion of support 42 is an integrally formed central supporting hub portion 44. In the space intervening between the outer tubular and inner hub portion 44 of support 42 is the sleevelike body 48 of a transmission selector control knob, indicated generally at 46. The body 48 is rotatably received over hub 44 for close supporting association therewith, the knob 46 further including an exposed annular manipulating head 50 centrally recessed at 52 and bored to receive the extreme outer end portion of the hub 44. The knob is further arranged for limited sliding movement on hub 44 between a normal projected position as shown in the drawing, and any number of slightly depressed positions resisted by a compression spring 54 seated between head 50 and a ring 56 seated on support 42. Such axially depressed conditions of the knob may be used to distinguish between and require conscious manipulation of the knob to and from the various rotary positions thereof as will be described, corresponding to the various drive ranges of the vehicle power transmission, such as "Park," "Reverse," "Neutral," "Drive," "Intermediate" and "Low."

Figure 3:
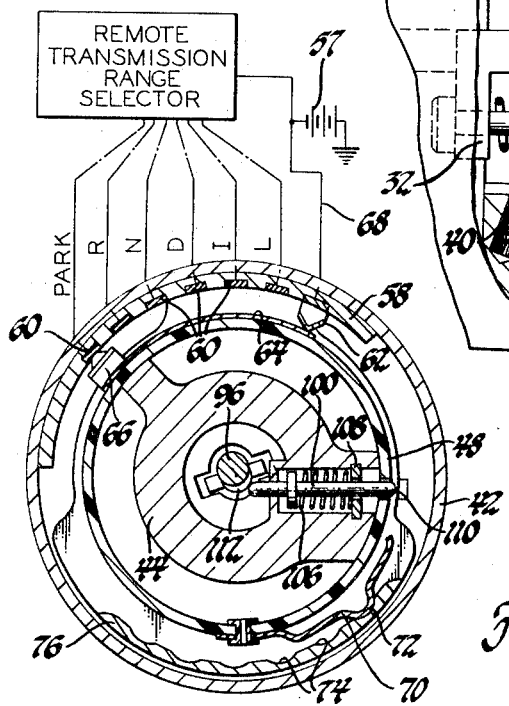
FIG. 3 is a sectional view taken generally along the plane indicated by line 3-3 of FIG. 2.

These various rotary positions of the knob are indicated in clockwise sequence in FIG. 3 with respect to the closure of rotary switch apparatus on the knob in various modes corresponding to the drive ranges of the transmission. In the preferred embodiment, rotation of the selector knob 46 to its various selectable positions close individual ones of a series of electrical contacts operative to establish circuit from a power source such as the vehicle battery 57 to a remote transmission range control device so that such device is caused to place the vehicle automatic transmission in the selected drive range. Such device, as is well known in the art, may be embodied in a rotary position motor, relay and switch structure mounted on the transmission housing and mechanically connected with the usual manual selector lever provided on the exterior of the housing. Alternatively, the rotary switch structure on knob 46 may be connected with internal gear changing electrical control apparatus within the transmission such as disclosed, for example, in U.S. Pat. to Weymann 2,811,051 issued Oct. 29, 1957. Specifically, the rotary switch structure for knob 46, as seen best in FIG. 3, may include an insulator board or strip 58 mounted on the internal periphery of the tubular portion of support 42 and having mounted therein a plurality of contact strips 60 and a stationary spring contact 62. The latter constantly engages a contact strip 64 extending over an arc portion of the knob body 48 and suitably insulated, such strip being connected with another spring contact 66 on the body 48 rotatable therewith to any of the various indicated positions in which such spring contact 66 is engageable with a selected one of the several strips 60. Thus, circuit may be completed through a lead 68 connected to spring contact 62 to complete a circuit through strip 64, spring contact 66 and the selected one of strips 60, thereby to select the drive range of the power transmission. As also indicated in FIG. 3, detenting apparatus for releasably holding the various selected positions of knob 46 includes an undulated cantilever spring 70 having a convolution 72 thereof receivable in any of the several depressions 74 formed in detent plate 76 on support 42. Knob rotation carries convolution 72 to various detenting positions within the depressions 74 corresponding to the juxtaposed position of spring contact 66 and the individual strips 60. In addition to this rotary detenting, suitable axial gating as above-described may be included between support 42 and knob 46 to distinguish the rotary positions of the latter.

Support hub 44 has further mounted thereon at its inner end portion a rotary ignition switch structure 78 including a terminal cap 80 provided with several blade terminals 82, the cap being held by staking over a terminal end flange of hub 44. The switch 78 is generally conventional in including a rotor 84 having enlarged and reduced diameter portions thereof mounted in counterbores of the hub 44 for rotation relative thereto, the rotor carrying a spring-biased contact plate 86 provided with embossments 88 engageable upon rotation of the rotor 84 with selected imbedded strip elements 90 in the cab 80 electrically connected with respective ones of the terminals 82. Thus, rotation of rotor 84 to any of several usual well-known circuit controlling positions thereof such as "Off," "On" and "Start" may interrupt or connect a circuit between a battery terminal 82 and the vehicle ignition terminal either alone or concurrently with closure between an engine starter motor terminal and the battery terminal. A further rotary position may be provided for the usual "Accessory" condition energizing selected accessory circuits independently of the vehicle ignition circuit. In addition to the range of positions just noted, rotor 84 accommodates an "Off-Lock" position as will be described.

Mounted within support hub 44 concentrically with knob 46 is a key-controlled cylinder lock actuator device 92 including a casing 94 nonrotatably mounted in a central bore of the hub and in turn within which is rotatably mounted a conventional tumbler and key receiving core, not shown in detail. As is typical, the actuator core may be rotatably held in a preselected rotary position within casing 94 by withdrawing its coded key to allow projection of a tumbler operated side locking bar or the like into the casing. In a preferred embodiment, this occurs in the "Off-Lock" position of rotor 84, shown in the drawings. Insertion of the coded key of course withdraws the tumblers to allow rotation of the actuator core to any of the several unlocked positions including "Off," "On" and "Start." While not shown in detail, the actuator core has suitable rotary drive connection with a cam 96 rotatably mounted in hub 44 above the rotor 84 so that key rotation of the actuator core rotates the cam. Cam 96 is further nonrotatably joined with a shaft 98 extending through switch 78 to have pin and slot or like nonrotatable drive connection with sector 38 of the steering shaft lock.

A knob lock bolt 100 of pinlike conformation is mounted in a radially extending bore 102 of hub 44 for shifting movement between a locked position as shown, and an unlocked position, not shown. Immediately below the bolt 100, a key and key-way connection 104 is provided between the cam 96 and the rotor 84 of the switch so that rotation within actuator 92 moves the rotor between the various selectable circuit-controlling positions thereof. Bolt 100 is biased to its unlocked position by a coil compression spring 106 seating between an annular flange of the bolt and a snapring 108 within bore 102. In its locked position shown, bolt 100 is received within an aperture 110 provided in body 48 of the knob, the aperture closely conforming to the diameter of the bolt. Thus, the bolt is receivable within the aperture only when the aperture is aligned with bore 102 in a predetermined position of the knob corresponding to a nonforward drive range of the vehicle power transmission. This position is preferably selected as "Park."

With the knob thus placed in "Park," key rotation within actuator 92 from any of its circuit-controlling positions such as "On" or "Off" to the extreme "Off-Lock" position shown in the drawing, causes, as seen best in FIG. 3, counterclockwise rotation of a cam lobe 112 on cam 96 to engage the locked end of lock bolt 100 and project it against the bias of spring 106 to its locked position within aperture 110. Concurrently, rotation of drive shaft 98 rotates sector 38 in a corresponding direction to move the lock bolt 24 from any of the several unlocked positions to the locked position shown. Withdrawal of the key from actuator 92 places the same in locked position and accordingly the transmission, ignition and steering controls of the vehicle are effectively locked against unauthorized operation until the coded key is again inserted in the actuator for rotation of the same, clockwise as viewed in FIG. 3, to allow spring depression of lock bolt 100 by clockwise removal of lobe 112 and by rotation of sector 38 removing lock bolt 24 from keeper plate 20. Lobe 112 is preferably rotatably removed and the sector substantially rotated immediately upon the initial rotation clockwise within actuator 92 to the "Off" position of rotor 84.

The outer end of lock bolt 100 and the aperture 110 constitute gate and stop means effective upon the lock bolt to prevent the coincidental locking of the various controls until a safe nonforward drive range "Park" of the vehicle is occasioned by rotation of knob 46 to its corresponding such position. This arises from the fact that with aperture 110 in any other position than that of "Park" shown, the wall of body 48 obstructs radially outward movement of bolt 100, and this blocking in turn prevents rotation of cam lobe 112 and the core of actuator 92 to its "Off-Lock" position. Thus, the steering shaft lock bolt 24 is likewise prevented from being moved to locking position only until aperture 110 is aligned with bolt 100 in "Park." Only then may actuator 92 rotate cam 96 to the "Off-Lock" position shown, and move bolts 100 and 24 to locking position. Thus, inadvertent locking of steering wheel 12 is effectively prevented until the vehicle is safely placed in nonforward transmission condition.

Having thus described the invention, what I claim is:

1. In an automotive vehicle including steering mechanism having a rotatable steering shaft, and power transmission apparatus provided with a plurality of drive ranges, the combination comprising, a control apparatus support within the vehicle, a transmission selector knob mounted for selected rotation about an axis thereof on said support between a plurality of positions each corresponding to a drive range of said power transmission, said knob having associated therewith remote transmission range control means adapted for interconnection with a remotely controllable device operative to place said power transmission in a selected drive range thereof corresponding to the position of said knob, a key-controlled cylinder lock actuator disposed on said support concentrically within said selector knob for rotation independently thereof between a plurality of positions, ignition switch means mounted on said support and adapted for operative connection with the electrical engine controls of the vehicle, means connecting said actuator with said switch means for establishing selected circuit controlling conditions thereof in response to selected rotation of said actuator between corresponding positions thereof, steering shaft lock bolt means mounted on said support for movement between locked and unlocked positions with respect to said steering shaft, means connecting said actuator with said steering lock bolt means for movement of the latter between the locked and unlocked positions thereof in response to rotation of said actuator to and from a preselected one of said circuit controlling positions thereof in which the actuator is lockable by withdrawal of the key therefor, selector knob lock bolt means mounted on said support for movement radially of said knob between locked and unlocked positions relative to the latter, cam means on said actuator operative upon rotation of the latter to said preselected one of its circuit-controlling positions to cause movement of said lock bolt means radially of said knob toward the locked position thereof, and blocking means on said knob and said knob lock bolt means preventing rotation of said actuator to said preselected one circuit-controlling position thereof and movement of said steering and said knob lock bolt means by said actuator to said locked positions thereof except upon rotation of said knob to a predetermined rotary position thereof corresponding to a nonforward drive range of the vehicle power transmission.

2. In an automotive vehicle including a steering column provided with a stationary support tube having a rotatable steering shaft therein, and power transmission apparatus provided with a plurality of drive ranges, the combination comprising, a transmission selector knob mounted for selected rotation about an axis thereof on said support tube between a plurality of positions each corresponding to a drive range of said power transmission, said knob and said support tube having mounted thereon rotary electrical contact means adapted for interconnection in circuit with remotely controllable electrical apparatus operative to select drive ranges of said power transmission in response to rotation of said knob to selected positions thereof, a key-controlled cylinder lock actuator disposed on said support tube concentrically within said selector knob for rotation independently thereof between a plurality of positions, a rotary ignition switch mounted on said support tube and adapted for operative connection with the electrical engine controls of the vehicle, means connecting said actuator with said switch for establishing selected circuit controlling conditions thereof in response to selected rotation of said actuator between corresponding positions thereof, steering shaft lock bolt means mounted on said support tube for movement between locked and unlocked positions with respect to said steering shaft, means for connecting said actuator with said steering lock bolt means for movement of the latter between the locked and unlocked positions thereof in response to rotation of said actuator to and from a preselected one of said circuit-controlling positions thereof in which the actuator is lockable by withdrawal of the key therefor, selector knob lock bolt means mounted on said support tube for movement radially of said knob between locked and unlocked positions relative to the latter, cam means on said actuator operative upon rotation of the latter to said preselected one of its circuit-controlling positions to cause movement of said lock bolt means radially of said knob toward the locked position thereof, and blocking means on said knob and said knob lock bolt means preventing rotation of said actuator to said preselected one circuit-controlling position thereof and movement of said steering and knob lock bolt means by said actuator to said locked positions thereof except upon rotation of said knob to a predetermined rotary position thereof corresponding to a nonforward drive range of the vehicle power transmission.

3. In an automotive vehicle including steering mechanism having a rotatable steering shaft, and power transmission apparatus provided with a plurality of drive ranges, the combination comprising, a control apparatus support within the vehicle, a transmission selector knob mounted for selected rotation about an axis thereof on said support between a plurality of selectable positions each corresponding to a drive range of said power transmission, said knob including remote position control means adapted for interconnection in circuit with a remotely controllable device for selecting corresponding drive ranges of said power transmission is response to rotation of said knob to selected positions thereof, a key-controlled cylinder lock actuator disposed on said support concentrically within said selector knob for rotation independently thereof between a plurality of positions, a rotary ignition switch mounted on said support concentrically of said knob and said actuator and adapted for operative connection with the electrical engine controls of the vehicle, a drive shaft extending axially from said actuator and connected with said switch for establishing selected circuit-controlling conditions thereof in response to selected rotation of said actuator between corresponding positions thereof, a shiftable steering shaft lock bolt mounted on said support for movement between locked and unlocked positions with respect to said steering shaft, rack and sector means connecting said drive shaft with said steering shaft lock bolt for movement of the latter between the locked and unlocked positions thereof in response to rotation of said actuator to and from a preselected one of said circuit-controlling positions thereof in which the actuator is lockable by withdrawal of the key therefor, a selector knob lock bolt mounted on said support for movement radially of said knob between locked and unlocked positions relative to the latter, means biasing said knob lock bolt to the unlocked position thereof, a cam on said actuator formed eccentrically thereof and operative upon rotation of the latter to said preselected one of its circuit-controlling positions to project said knob lock bolt radially of said knob from the unlocked to the locked position thereof against the action of said biasing means, and gate and stop structure on said knob operative in a predetermined position thereof to receive said knob lock bolt in the locked position thereof to prevent rotation of said knob and engageable with said knob lock bolt to prevent rotation of said actuator to said preselected one circuit-controlling position thereof and movement of said steering and knob lock bolts by said actuator to said locked position except upon rotation of said knob to said predetermined position thereof.

4. In an automotive vehicle including a steering column provided with a stationary support tube having a rotatable steering shaft therein, and power transmission apparatus with a plurality of drive ranges, the combination comprising, a transmission selector knob mounted for selected rotation about an axis thereof on said support tube between a plurality of positions each corresponding to a drive range of said vehicle power transmission, said knob and said support tube having mounted thereon rotary electrical contact means adapted for interconnection in circuit with remotely controllable electrical apparatus operative to select drive ranges of said power transmission in response to rotation of said knob to selected positions thereof, a key-controlled cylinder lock actuator disposed on said support tube concentrically within said selector knob for rotation independently thereof between a plurality of positions, a rotary ignition switch mounted on said support tube concentrically of said knob and said actuator and adapted for operative connection with the electrical engine controls of the vehicle, a drive shaft extending axially from said actuator and connected with said switch for establishing selected circuit-controlling conditions thereof in response to selected rotation of said actuator between corresponding positions thereon, a steering shaft lock bolt mounted on said support tube for shiftable movement between the locked and unlocked positions with respect to said steering shaft, rack and sector means connecting said drive shaft with said steering shaft lock bolt for movement of the latter between the locked and unlocked positions thereof in response to rotation of said actuator to and from a preselected one of said circuit controlling positions thereof in which the actuator is lockable by withdrawal of the key therefor, a selector knob lock bolt mount on said support tube for movement radially of said knob between locked and unlocked positions relative to the latter, means biasing said knob lock bolt to the unlocked position thereof, a cam on said actuator formed eccentrically thereof and operative upon rotation of the latter to said preselected one of its circuit-controlling positions to project said knob lock bolt radially of said knob from the unlocked to the locked position thereof against the action of said biasing means, and gate and stop structure on said knob operative in a predetermined position thereof to receive said knob lock bolt in the locked position thereof to prevent rotation of said knob and engageable with said knob lock bolt to prevent rotation of said actuator to said preselected one circuit-controlling position thereof and movement of said steering and knob lock bolts and said actuator to said locked position except upon rotation of said knob to said predetermined position thereof.